United States Patent
Tanabe

(10) Patent No.: US 7,667,554 B2
(45) Date of Patent: Feb. 23, 2010

(54) PRE-EMPHASIS ADJUSTMENT METHOD

(75) Inventor: Motoi Tanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 888 days.

(21) Appl. No.: 11/365,599

(22) Filed: Mar. 2, 2006

(65) Prior Publication Data

US 2006/0204245 A1    Sep. 14, 2006

(30) Foreign Application Priority Data

Mar. 4, 2005    (JP) .............................. 2005-060944

(51) Int. Cl.
*H04B 1/64*        (2006.01)
(52) U.S. Cl. ............................ 333/14; 375/219; 455/72
(58) Field of Classification Search .................. 333/14; 455/72; 381/103; 375/219
See application file for complete search history.

(56) References Cited

U.S. PATENT DOCUMENTS

| | | | |
|---|---|---|---|
| 6,934,479 B2 * | 8/2005 | Sakamoto et al. | 398/193 |
| 7,006,580 B2 * | 2/2006 | Haycock | 375/296 |
| 7,280,763 B2 * | 10/2007 | Yamaguchi et al. | 398/94 |
| 2006/0034358 A1 * | 2/2006 | Okamura | 375/219 |

FOREIGN PATENT DOCUMENTS

JP    06-177798 A    6/1994

* cited by examiner

*Primary Examiner*—Robert Pascal
*Assistant Examiner*—Alan Wong
(74) *Attorney, Agent, or Firm*—Sughrue Mion, PLLC

(57) ABSTRACT

A pulse train having a specific amplitude is transmitted from a transmitting circuit, and the amplitude at the receiving end is measured by a comparator. A coarse adjustment control unit determines a coarse adjustment value of the pre-emphasis intensity based on the measured amplitude. The pre-emphasis intensity is changed within the course pre-emphasis range, and the maximum receivable time width of a test signal is obtained by a reception judging unit 13 by using a fine adjustment stage.

9 Claims, 3 Drawing Sheets

PRE-EMPHASIS ADJUSTMENT METHOD

BACKGROUND OF THE INVENTION

1. Field of the Invention

The present invention relates to a pre-emphasis adjustment method and more particularly, to a pre-emphasis adjustment method for controlling the pre-emphasis intensity provided at the transmission side of a signal transmission line based on a received signal. The present invention also relates to a pre-emphasis adjusting system having a pre-emphasis intensity adjusting function.

2. Description of the Related Art

Generally, in a transmission line, transmission signals in a high frequency range involve a larger attenuation rate. Accordingly, when signals of a plurality of frequency components are transmitted from the transmission side at the same level for all of the frequency components in the signal, there occurs a difference in the amplitude of the signal between the higher frequency components and the lower frequency components at the receiving side which receives the signals through the transmission line. Normally, to reduce the difference in the signal level or amplitude between the different frequencies at the transmission side, a pre-emphasis technique is used in which the signal level of the lower frequency components is lowered beforehand, or the signal level of the higher frequency components is raised beforehand and then a signal including the lower signal components and higher signal components is transmitted (for example, refer to JP-A-06-177798). In this manner, at the transmission side, the signal level is differentiated between the lower frequency components and the higher frequency components. Thereby, the signal level at the receiving side can be maintained substantially constant among all the frequency components in the signal irrespective of the frequencies.

Regarding the pre-emphasis, it is important to create the pre-emphasis of appropriate intensity according to the characteristics, etc., of the transmission line. FIG. 3A shows the configuration of a conventional automatic adjustment system for adjusting the pre-emphasis. An adjustment control unit 54 of the receiving side transmits a pre-emphasis intensity control signal to a transmitting circuit 51, and an automatic control unit 55 of the transmitting circuit 51 controls the pre-emphasis intensity of the transmission signal to be transmitted from the transmitting circuit 51.

A reception judging unit 53 judges whether or not the signal transmitted by the transmitting circuit 51 can be received correctly at the receiving circuit 52. Then, the reception judging unit 53 obtains a receivable time width, or time interval, in which the transmission signal can be received, while controlling the delay of the timing of a clock signal for receiving the signal, as shown in FIG. 3B.

In the automatic pre-emphasis adjustment system shown in FIG. 3A, the above procedure is tried for all of the adjustment values of the pre-emphasis intensity, and the pre-emphasis intensity of the transmitting circuit 51 is adjusted so that the receivable time width assumes a maximum. This is exemplified in FIG. 3C, wherein the pre-emphasis intensity is lowered, for example, from the maximum level toward a minimum level of the pre-emphasis intensity in a step-by-step basis, until an optimum pre-emphasis intensity is detected.

If the signal transmission bit rate in the above conventional pre-emphasis technique is on the order of 10-Gbps class, the number of adjustment steps of the pre-emphasis intensity is extremely large in order to correctly receive the transmission signal by the receiving circuit 52. For example, the receiving circuit 52 requires 100 steps or more for the procedure for determining the receivable time width. Therefore, if the signal transmission bit rate is high, and if the pre-emphasis intensity that maximizes the receivable time width is to be obtained by trying all of the adjustment values, it takes an extremely large time length to complete the pre-emphasis adjustment.

SUMMARY OF THE INVENTION

It is an object of the present invention to eliminate the problem of the conventional art, and to provide a pre-emphasis adjustment method and a pre-emphasis adjustment system which can complete the adjustment of the pre-emphasis intensity in a short time length is even in the case of a transmission line having a high transmission bit rate.

The present invention provides a method for adjusting a pre-emphasis intensity in a transmitting circuit having a pre-emphasis intensity adjusting function. The method includes the steps of: transmitting a cyclic signal having a specific amplitude and a specific frequency through a signal transmission line; measuring an amplitude of the cyclic signal received in a receiving circuit through the signal transmission line, to determine an attenuated rate of the received cyclic signal; determining a coarse pre-emphasis intensity range based on the determined attenuated rate; transmitting a plurality of test signals each having a specific pre-emphasis intensity within the coarse pre-emphasis intensity range through the signal transmission line, to determine a desired pre-emphasis intensity; and transmitting a desired signal having the desired pre-emphasis intensity.

The present invention also provides a pre-emphasis adjusting system for adjusting a pre-emphasis intensity of a signal transmitted from a transmitting circuit having a pre-emphasis intensity adjusting function and received in a receiving circuit through a transmission line. The pre-emphasis adjusting system includes: an amplitude measuring device for measuring an amplitude of a cyclic signal received in the receiving circuit, the cyclic signal being transmitted from the transmitting circuit as the cyclic signal having a specific amplitude; a coarse pre-emphasis adjusting device for determining a coarse pre-emphasis intensity range based on the amplitude measured by the amplitude measuring device; and a fine pre-emphasis adjusting device for determining a fine adjustment value for the pre-emphasis intensity based on a plurality of test signals each having a pre-emphasis intensity within the coarse pre-emphasis intensity range.

In accordance with the present invention, the cyclic signal transmitted from the transmitting circuit is measured for the attenuation rate thereof after being transmitted through the transmission line. Based on the attenuated rate of the received cyclic signal, a coarse adjustment range for the pre-emphasis intensity is determined, and a fine adjustment is conducted within the coarse pre-emphasis intensity range, to thereby reduce the time length needed for the pre-emphasis adjustment.

In a preferred embodiment of the pre-emphasis adjustment method and system of the present invention, the amplitude of the cyclic signal having the specific amplitude is measured in the receiving circuit to determine the roughly adjusted value, or coarsely adjusted value, of the pre-emphasis intensity based on the measured amplitude and the specific amplitude value, and then the pre-emphasis intensity is finely adjusted within the coarse adjustment range, which is determined based on the attenuation of the received cyclic signal, by using the plurality of test signals each having a finely adjusted pre-emphasis intensity within the coarse adjustment range. In this manner, since the adjustment of the pre-emphasis intensity is conducted at two stages including the coarse adjustment stage and the fine adjustment stage, the time length required for adjusting the pre-emphasis intensity can be reduced.

DETAILED DESCRIPTION OF THE PREFERRED EMBODIMENTS

Figure 1A:
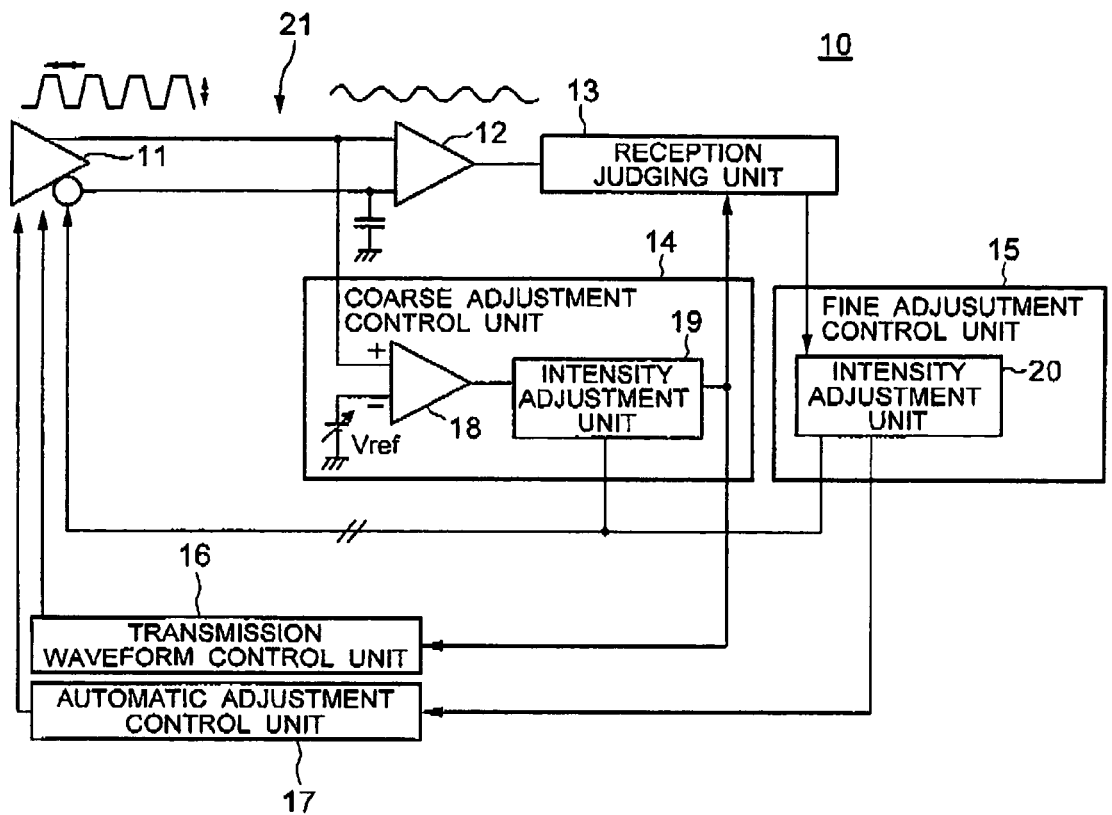
FIG. 1A is a block diagram showing the configuration of a signal transmission system including a pre-emphasis adjusting system according to an embodiment of the present invention.

Preferred embodiments of the present invention will now be described in detail with reference to the accompanying drawings. FIG. 1A shows the configuration of a signal transmission system including a pre-emphasis adjustment system according to an embodiment of the present invention. The signal transmission system 10 includes a transmitting circuit 11, a signal transmission line 21, a receiving circuit 12, and a pre-emphasis adjustment system installed in the signal transmission system 10.

The pre-emphasis adjustment system includes a reception judging unit 13, a coarse adjustment control unit 14, a fine adjustment control unit 15, a transmission waveform control unit 16, and an automatic adjustment control unit 17. In the exemplified configuration, the transmitting-side LSI includes the transmitting circuit 11, transmission waveform control unit 16 and automatic adjustment control unit 17, whereas the receiving-side LSI included the receiving circuit 12, reception judging unit 13, coarse adjustment control unit 14 and fine adjustment control unit 15. However, these units may be installed either in the receiving-side LSI, in the transmitting-side LSI or in another LSI or other LSIs.

The transmitting circuit 11 transmits a desired signal to the receiving circuit 12 through the signal transmission line 21. Before transmission of the desired signal, the transmitting circuit 11 creates a pre-emphasis to the transmission signal. The pre-emphasis intensity provided by the transmitting circuit 11 is adjustable according to a pre-emphasis intensity adjustment signal.

The automatic adjustment control unit 17 controls the automatic adjustment start/completion of the pre-emphasis adjustment procedure. The automatic adjustment of the pre-emphasis intensity is performed in two stages: a coarse adjustment stage and a fine adjustment stage succeeding to the coarse adjustment stage. The transmission waveform control unit 16 controls the signal pattern output from the transmitting circuit 11 during the coarse adjustment stage and the fine adjustment stage.

The coarse adjustment control unit 14 has a comparator 18 and an intensity adjustment unit 19. The coarse adjustment control unit 14 performs the coarse adjustment of the pre-emphasis intensity based on the transmitted signal received by the receiving circuit 12 during the coarse adjustment stage. The comparator 18 compares the transmitted signal received by the receiving circuit 12 against a reference voltage Vref and outputs the comparison result. The comparison result provides a maximum signal level and a minimum signal level of the received signal. The intensity adjustment unit 19 transmits a pre-emphasis intensity adjustment signal to the transmitting circuit 11, the pre-emphasis intensity adjustment signal corresponding to the comparison result obtained during the coarse pre-emphasis adjustment stage.

The coarse adjustment control unit 14 determines the degree or rate of attenuation, by which the amplitude of the transmission signal is attenuated or reduced, while using an S-Parameter measuring technique, and performs the coarse adjustment of the value of the pre-emphasis intensity based on the thus determined attenuation rate. Generally, the known S-Parameter measuring technique provides the attenuation rate of the transmitted signal across the transmission line. The attenuation rate in the transmission line is obtained by transmitting a cyclic wave signal, such as a sine-wave signal, having a known amplitude and measuring the amplitude of the cyclic wave signal after it passed through the transmission line.

In the present embodiment, the concept of the S-Parameter measurement is employed, wherein the cyclic signal of a known amplitude and a known frequency is transmitted by the transmitting circuit 11 and the signal amplitude of the attenuated signal, at which the cyclic signal is received by the receiving end, is detected by the coarse adjustment control unit 14. Thereafter, the approximate level of the attenuated amplitude across the transmission line is determined, and the coarse adjustment value is determined based on the measurement of the level of the attenuated amplitude.

Figure 1B:
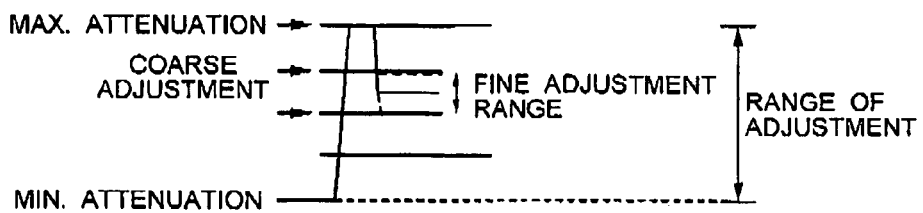
FIG. 1B is a schematic diagram for showing the two-stage pre-emphasis adjusting procedure in the pre-emphasis adjusting system shown in FIG. 1A.

The fine adjustment control unit 15 has an intensity adjustment unit 20. The reception judging unit 13 judges whether or not the signal transmitted from the transmitting circuit 11 can be correctly received by the receiving circuit 12 and obtains a range for accurately determining the transmitted signal as a receivable time width, while delaying in a step-by-step basis the timing of the clock signal for receiving the transmitted signal. The fine adjustment control unit 15 changes the pre-emphasis intensity adjustment signal within a predetermined range from the coarse adjustment value adjusted by the coarse adjustment control unit 14 during the fine adjustment stage, as shown in FIG. 1B.

The fine adjustment control unit 15 transmits the changed pre-emphasis intensity adjustment signal through the intensity adjustment unit 20 to the transmitting circuit 11. The fine adjustment control unit 15 also receives the judgment result from the reception judging unit 13 and finely adjusts the adjustment value of the pre-emphasis intensity. Here, the pre-emphasis intensity adjustment signal has a plurality of bits, and includes bits of the coarse adjustment and bits of the fine adjustment.

Figure 2:
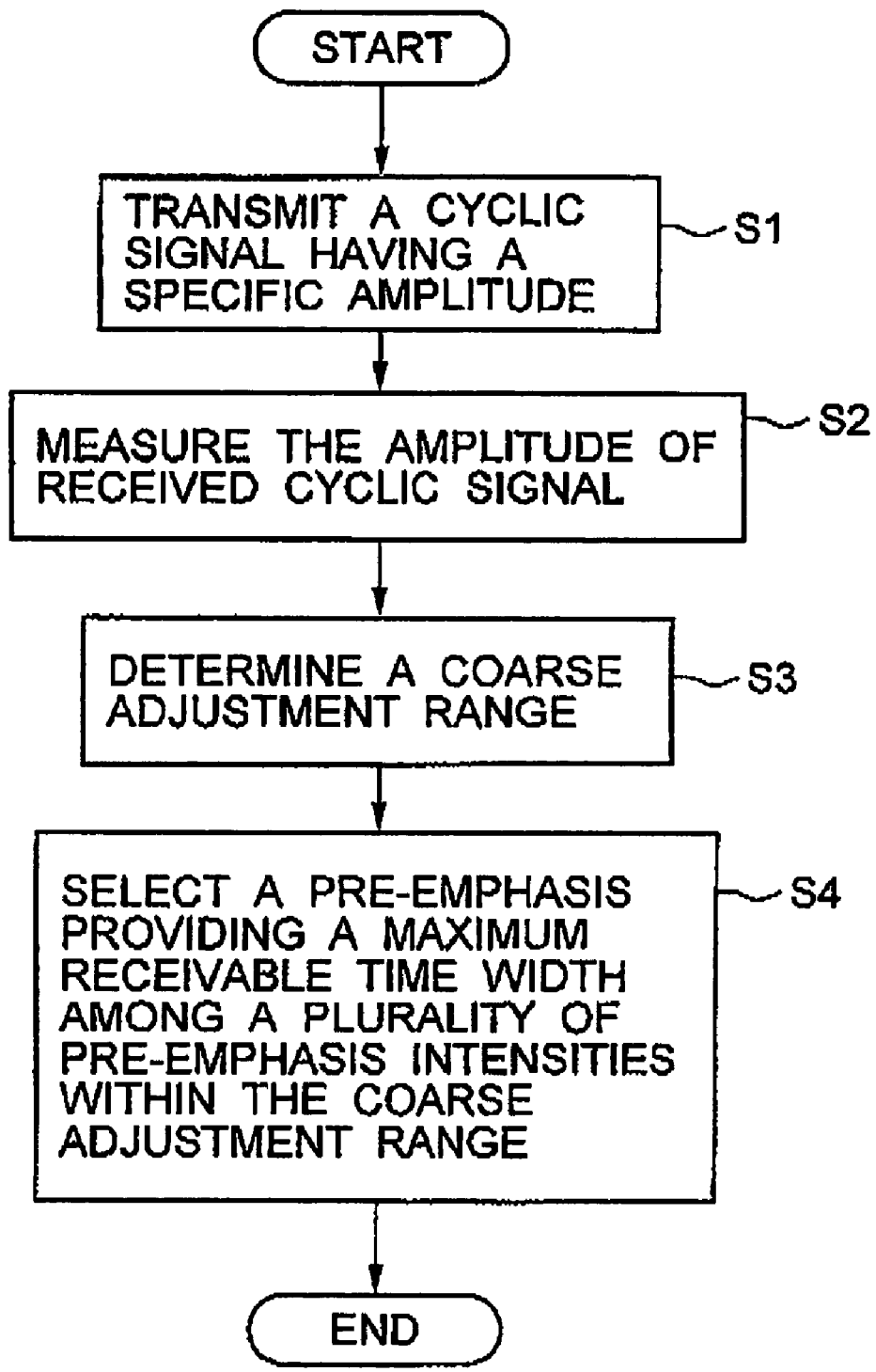
FIG. 2 is a flowchart showing the procedure for adjusting the pre-emphasis intensity in the pre-emphasis adjusting system shown in FIG. 1.
Figure 3A:
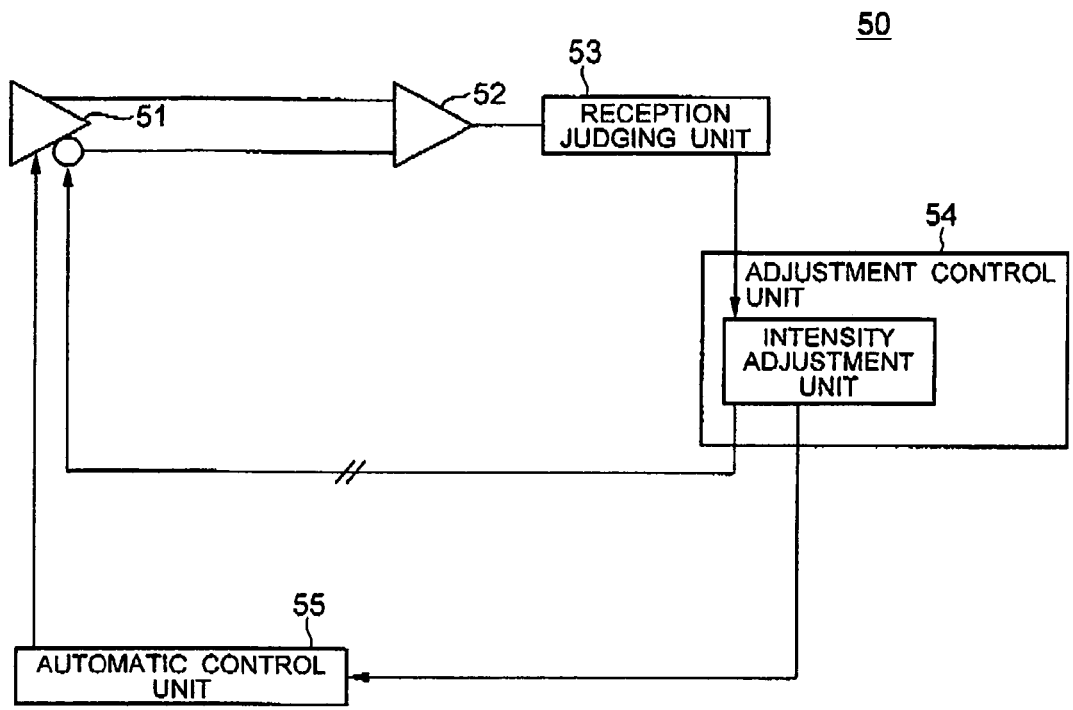
FIG. 3A is a block diagram showing the configuration of a conventional signal transmission system.
Figure 3B:
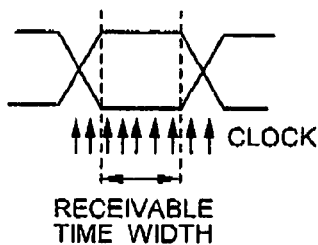
FIG. 3B is a schematic diagram for showing the conventional pre-emphasis adjusting procedure in the signal transmission system shown in FIG. 3A.
Figure 3C:
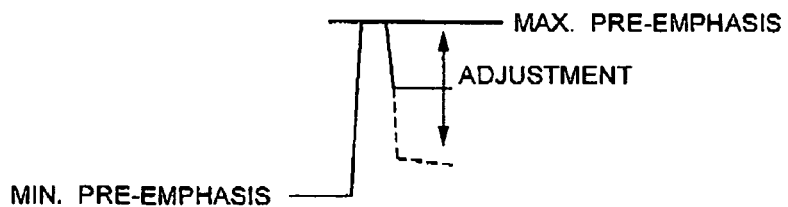
FIG. 3C is a schematic diagram showing the adjustment procedure of the pre-emphasis intensity therein.

FIG. 2 shows the procedure of the signal transmission system 10 shown in FIG. 1 during adjustment of the pre-emphasis intensity by the pre-emphasis adjustment system. The procedure of the automatic adjustment for the pre-emphasis intensity will be described hereinafter with reference to FIGS. 1 and 2.

The automatic adjustment control unit 17 sets the level of the automatic adjustment control signal input to the transmitting circuit 11 at a Low level. The transmitting circuit 11 selects the transmission waveform control signal from the transmission waveform control unit 16 as an active signal. The transmission waveform control unit 16 transmits the transmission waveform control signal having a High level to the transmitting circuit 11. The transmitting circuit 11 receives this transmission waveform control signal of the High level. The transmitting circuit 11 then outputs a pulse train of the known amplitude, "A" volts, at a repetitive frequency equal to half the frequency corresponding to the maximum transmission bit rate of the transmission line (step S1). That is, the transmitting circuit 11 transmits the pulse train at the maximum transmission rate of the transmission line.

The signal transmitted from the transmitting circuit 11 and attenuated across the transmission line is input to the non-inverting (+) terminal of the comparator 18, which compares the transmitted signal against a reference voltage Vref input to the inverting (−) terminal of the comparator 18. The coarse adjustment control unit 14 changes the reference voltage Vref, and measures the amplitude, "B" volts, of the transmitted signal received by the receiving circuit 12 (step S2). This measurement is performed to determine a lower limit of the signal level at which the comparator cannot anymore determine a Low level for the output thereof, and an upper limit of the signal level at which the comparator cannot anymore determine a High level for the output thereof. The measurement wherein the reference voltage Vref is gradually lowered, for example, provides a difference between the upper limit and the lower limit, the difference corresponding to the amplitude of the received signal.

The amplitude attenuation rate at the receiving end is obtained based on the known amplitude, A volts, and the amplitude, B volts, measured by the comparator 18 by the ratio B/A. The intensity adjustment unit 19 stores therein the range of the amplitude attenuation rate at the receiving end and the roughly adjusting value of the pre-emphasis intensity in a one-to-one correspondence. For example, coarse adjusting values a0, a1, a2, ... (a0<a1<a2, ... ) are stored for the levels of measured attenuation rate a0-a1, a1-a2, a2-a3, ..., respectively, for the signal attenuation rate at the receiving end with a 5% step, for example, i.e., for the ranges of attenuation rate from 0% to 5%, from 5% to 10%, 10% to 15% etc.

The intensity adjustment unit 19 transmits the adjusting value obtained according to the amplitude attenuation rate at the receiving end obtained by the comparator 18 to the transmitting circuit 11 by using the pre-emphasis intensity adjustment signal (step S3). In addition thereto, a rough adjustment completion signal is transmitted to the reception judging unit 13 and the transmission waveform control unit 16.

The transmitting circuit 11 determines the pre-emphasis intensity based on the coarse adjustment signal transmitted from the coarse adjustment control unit 14, and lowers, for example, the signal level of the low frequency components. After the transmission waveform control unit 16 receives the rough adjustment completion signal, the transmission waveform control unit 16 lowers the transmission waveform control signal to a Low level. Upon reception, the transmitting circuit 11 outputs a random waveform, and starts the adjustment of the pre-emphasis intensity by using the fine adjustment procedure (step S4).

The receiving circuit 12 receives the random waveform having a pre-emphasis through the transmission line 21, and transfers the same to the reception judging unit 13. The reception judging unit 13 detects the receivable time width for the received random waveform, and transmits a signal showing the detected receivable time width, to the fine adjustment control unit 15. As the detected receivable time width, a digital signal of a plurality of bits or an analog signal showing the detected receivable time width may be used.

The fine adjustment control unit 15 changes the fine adjustment value of the pre-emphasis intensity of the random waveform by a plurality of changeable steps at once in an ascending direction, for example, of the adjustment value for a portion of the each course adjustment range. The fine adjustment control unit 15 detects the increasing or decreasing trend of the receivable time width for the several fine adjustment steps based on the judgement signal form the reception judging unit 13. The reason of changing the fine adjustment value by the several changeable steps at once is that the change of the receivable time width corresponding to a single changeable step can be hardly observed and there is a possibility that the increasing or decreasing trend is difficult to detect for the single changeable step.

The increasing or decreasing trend of the receivable time width for the several steps can be easily detected by changing the adjustment value with the several steps at once. If the receivable time width is increased when the pre-emphasis intensity is changed in the ascending direction for the adjustment value, the ascending direction is continued until the receivable time width is decreased. On the contrary, if the receivable time width is decreased for the ascending direction of the pre-emphasis, then the pre-emphasis intensity is changed in the descending direction, which is continued until the ascending direction of the receivable time width is changed to a descending direction.

With the above-described operation, the fine adjustment control unit 15 detects the adjustment value at which the receivable time width is the maximum. After completion of the detection for the receivable time width, the fine adjustment control unit 15 transmits the pre-emphasis intensity adjustment signal specifying the detected fine adjustment value to the transmitting circuit 11. The fine adjustment control unit 15 also transmits the fine adjustment completion signal to the automatic adjustment control unit 17. The automatic adjustment control unit 17 changes the automatic adjustment control signal to a High level, to terminate the automatic adjustment procedure. The transmitting circuit 11 transmits a desired signal by using the pre-emphasis intensity thus adjusted by the coarse adjustment control unit 14 and the fine adjustment control unit 15.

For example, if it is judged that the attenuation rate of the signal level at the receiving end for the high-frequency component falls within the range between 10% and 15%, the pre-emphasis intensity of the transmitting circuit 11 is roughly determined according to the coarse adjustment value corresponding to the attenuation rate of 10% to 15%. In the fine adjustment stage, the pre-emphasis intensity that maximizes the receivable time width can be obtained by determining the receivable time width while changing the pre-emphasis intensity within the range corresponding to a 5% range between the 10% and the 15%.

As described above, in the coarse adjustment stage, the attenuation rate in the transmission line for the high-frequency component is first determined by using the S-Parameter measuring method, and the pre-emphasis intensity is roughly set based on the attenuation rate. The technique for detecting the fine adjustment value that maximizes the receivable time width in the fine adjustment stage after obtaining the coarse adjustment value reduces the number of adjustment stages which otherwise must be tried, and thus reduces the time length required for adjusting the pre-emphasis intensity.

Since the above embodiment is described only for examples, the present invention is not limited to the above embodiment and various modifications or alterations can be easily made therefrom by those skilled in the art without departing from the scope of the present invention.

What is claimed is:

1. A method for adjusting a pre-emphasis intensity in a transmitting circuit having a pre-emphasis intensity adjusting function, said method comprising the steps of:
   transmitting a cyclic signal having a specific amplitude and a specific frequency through a signal transmission line;
   measuring an amplitude of the cyclic signal received in a receiving circuit through the signal transmission line, to determine an attenuated rate of the received cyclic signal;
   determining a coarse pre-emphasis intensity range based on the determined attenuated rate;
   transmitting a plurality of test signals each having a specific pre-emphasis intensity within the coarse pre-emphasis intensity range through the signal transmission line, to determine a desired pre-emphasis intensity; and
   transmitting a desired signal having the desired pre-emphasis intensity.

2. The method according to claim 1, wherein said plurality of test signals transmitting step includes the steps of determining a receivable time width in which each of said test signals is correctly received, and selecting one of the plurality of test signals that provides a maximum receivable time width among the plurality of test signals.

3. The method according to claim 1, wherein said cyclic signal has a frequency equal to half a maximum transmission bit rate of the transmitting circuit.

4. A pre-emphasis adjusting system for adjusting a pre-emphasis intensity of a signal transmitted from a transmitting having a pre-emphasis intensity adjusting function and received in a receiving circuit through a transmission line, comprising:
   an amplitude measuring device for measuring an amplitude of a cyclic signal received in the receiving circuit, the cyclic signal being transmitted from the transmitting circuit as the cyclic signal having a specific amplitude;
   a coarse pre-emphasis adjusting device for determining a coarse pre-emphasis intensity range based on the amplitude measured by said amplitude measuring device; and
   a fine pre-emphasis adjusting device for determining a fine adjustment value for the pre-emphasis intensity based on a plurality of test signals each having a pre-emphasis intensity within the coarse pre-emphasis intensity range.

5. The pre-emphasis adjusting system according to claim 4, wherein said fine pre-emphasis adjusting device determines a receivable time width for each of the plurality of test signals, and selects one of the plurality of test signals corresponding to a maximum receivable time width among said plurality of test signals.

6. The pre-emphasis adjusting system according to claim 4, wherein the cyclic signal has a frequency equal to half a maximum transmission bit rate of the transmitting circuit.

7. The pre-emphasis adjusting system according to claim 4, wherein said amplitude measuring device includes a comparator for measuring a maximum signal level and a minimum signal level of the cyclic signal, and a judgement device for determining the amplitude of the cyclic signal based on a difference between the maximum signal level and the minimum signal level.

8. The receiving circuit comprising the pre-emphasis adjusting system according to claim 4.

9. A signal transmission system including the receiving circuit according to claim 8 and the transmitting circuit.

* * * * *